H. W. KIMES, DEC'D.
J. M. KIMES, EXECUTRIX.
VALVE.
APPLICATION FILED FEB. 5, 1916.

1,387,601. Patented Aug. 16, 1921.

Witnesses
C. B. Foster
Emma Spener

Inventor
Hugh W. Kimes

By Wood & Wood
Attorneys

UNITED STATES PATENT OFFICE.

HUGH W. KIMES, OF DAYTON, OHIO, ASSIGNOR TO THE VAILE-KIMES COMPANY, OF DAYTON, OHIO, A CORPORATION OF OHIO.

VALVE.

1,387,601.  Specification of Letters Patent.  Patented Aug. 16, 1921.

Application filed February 5, 1916. Serial No. 76,324.

*To all whom it may concern:*

Be it known that I, HUGH W. KIMES, a citizen of the United States, and residing at Dayton, in the county of Montgomery and State of Ohio, have invented a new and useful Improvement in Valves, of which the following specification is a full disclosure.

My invention relates to a valve, particularly adapted to be interposed in a water supply system, for controlling the operation of pumping apparatus, the valve being under the control of the pressure developed by the pumping apparatus.

Another object of the invention deals with a device providing a valve moved under the influence of the pressure of the fluid which it controls, and the valve governed by pressure actuated devices, as tripping means influenced by determined different degrees of pressure from a second source.

Another object of the invention is to provide a fluid controlling device with a valve movable within a cylindrical casing, the valve functioning as a piston and provided with a passage therethrough, communicating with chambers at the opposite ends thereof sustaining the valve under a pressure equilibrium for a movement to closed position, and when closed establish a seating pressure against the valve, and in providing one of said chambers with outlet ports for escaping the fluid or pressure in such chambers in a proportion excessive to that capable of passing through said valve passage, causing the pressure influence to prevail against the other end of the valve to quickly move the valve to its open position. The escape port is controlled by pressure actuated valve devices having a very limited functioning motion, comparative to the length of motion of said fluid controlling valve, and whereby the degrees of pressure for operating the one are predetermined and definite, while pressure for operating the second valve may be indeterminate and variable.

Various other objects and features of advantage are included in the details of construction of the device, as may be readily discernible from the following description of the accompanying drawings, illustrating a preferred embodiment of the invention, and in such drawings like characters of reference denote corresponding parts throughout the several views, of which:—

As the valve is primarily contemplated for use in connection with a particular type of water supply system for domestic service, a brief reference to such system will be made as an aid in understanding the function and operation of the valve. The system with the valve interposed, forms the subject-matter of a separate application filed on even date herewith, Serial No. 76,326, and to which reference should be had for a more comprehensive explanation of the system. The type of system with which the valve is combined is one principally for supplying soft water from a cistern or other container to fixtures for domestic service, with hydraulic power devices operating a pump for elevating the soft water from the cistern and forcing the same to a compression tank as a reserve supply under pressure and to the soft water fixtures or valve controlled outlets located at a point or points of use. The hydraulic motor devices are operated by a city water service pressure with the opening of a city water service fixture and continue in operation during such city water consumption period, unless automatically cut off. The valve to which this invention is directed provides a pressure actuated means controlled by a difference or variation in pressure between the determined degrees of pressure in the soft water branch, for automatically controlling the operation of the hydraulic power devices, causing the city service water to flow through the pump actuating means or hydraulic motor devices when the pressure in the soft water service falls below a certain degree, and for shunting or by-passing the city service water from such power devices when a determined degree of pressure in the soft water service is reached and maintained.

The city water service inlet connects with a motor and through the pump to the city service fixture for operating the motor during the consumption of city service water. The valve connects with and controls a by-passing or shunting branch around the motor for a direct water course from the inlet to the city service fixtures, and when open discontinues the motor operations.

Figure 2:
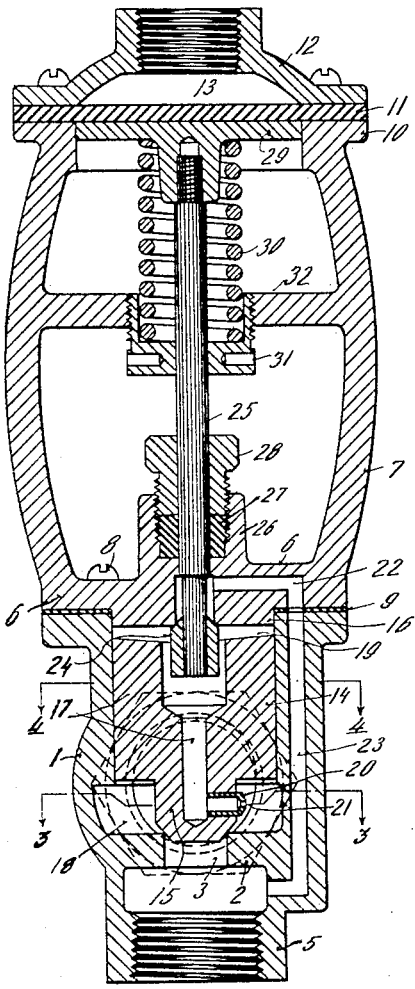
Fig. 2 is a central vertical section through the valve.
Figure 1:
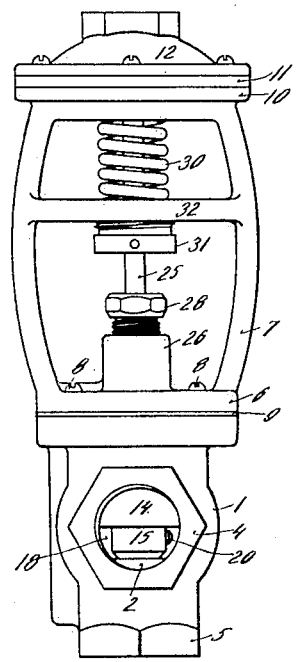
Figure 1 is a side elevation of the valve, drawn to a reduced scale.
Figure 4:
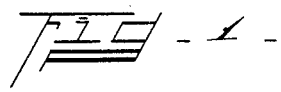
Fig. 4 is a section on line 4—4, Fig. 2.
Figure 4:
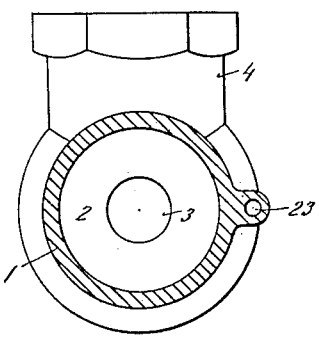
Figure 3:
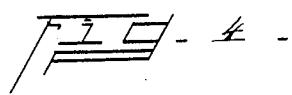
Fig. 3 is a section on line 3—3, Fig. 2.
Figure 3:
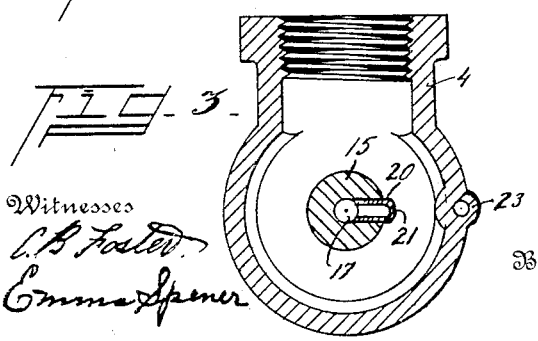

Referring to Fig. 1 of the drawings, 1 indicates a hollow valve casing interiorly divided by a cross-web 2, having a valve-seat equipped opening 3 therethrough and the integral pipe connecting nipple extensions 4 and 5 at opposite sides of said web, with the nipple 4 representing the inlet end for the city service water, and nipple 5 the discharge or outlet end. The upper end of the casing is annularly flanged and faced to receive the base plate 6 of the truss frame 7 as an intermediate portion of the device as a unit. The base plate 6 is secured to the end face of the casing 1, by screws 8, with packing 9 interposed between the connecting surfaces to form a hermetically sealed or water-tight joint. The opposite end of the truss frame 7 has an integral annulus 10 faced to receive a diaphragm 11 and cap plate 12 as the upper portion of the device. The diaphragm and cap plate 12 form a chamber 13 connecting with the soft water service piping when the device is installed, so that any variation in soft water pressure influences the diaphragm producing vibrating motions.

The casing 1 is centrally bored, forming a cylinder to slidably receive the piston valve comprising a piston portion 14 and a smaller diameter valve portion 15, adapted to engage against the seat of the web opening or port 3, for controlling the flow of water therethrough. The base plate 6 of the truss frame provides a closure for the cylinder chamber and has an annular boss extension 16 fitting the piston bore of the casing, to additionally seal such cylinder or casing end. The piston valve is bored to provide a passage 17 therethrough connecting the chambers 18, 19, respectively at opposite ends of the piston valve. The passage, at its inlet end preferably has a reducer nipple 20, driven into the passage bore and formed with a conical head as a precautionary measure to avoid any sediment or particles in the water engaging or seating across the restricted port 21, which may clog the port or obstruct the flow of water from said passage. The passage is open at all times for equalizing the pressure on both sides of the piston, to permit the same to move downwardly and seat its valve by gravity and when seated the valve is held closed under pressure, as the pressure influence is more prevailing against the upper piston end, exposing a greater area than its opposite end, and when the pressure is relieved from the chamber 19 at the upper end of the piston, the pressure prevails at the valve end of the piston, forcing the same upward, unseating and opening the valve. To relieve the chamber 19 of its pressure for valve opening, I provide the base-plate 6, with a conduit or passage 22, opening into the chamber 19 and connecting with a passage 23 in the casing 1, said passage 23 extending downwardly below the web 2 and beyond any controlling influence of the valve 15, and leading into the outlet end of the casing. Conduits 22, 23, therefore provide a single passage leading around the ends of the piston, with its inlet end controlled by a valve 24 connected to a valve stem 25 projecting upwardly through the stuffing-box formed by the sleeve extension 26 of the base-plate, the packing 27 and ferrule nut 28. The valve stem 25 connects with the diaphragm disk 29 guidingly supported within the head of the truss-frame 7 and engaged against the diaphragm 11, thus, with any expanding motion of the diaphragm it will depress the valve stem and its valve, opening the passage connecting with the chamber 19, or relieving said chamber of its pressure, which will enable the piston valve to be moved upwardly under the pressure in the chamber 18. When the diaphragm 11 moves in a reverse direction the valve 24 will again be seated under the pressure of spring 30, engaged against the disk 29 at one end with its opposite end seating within a recess in the nut 31, secured to the cross web 32 of the truss frame 7. The chamber 13 connects, when the device is used as an automatic control for water supply systems, with the supply service branch desired to be maintained under a predetermined degree of pressure, and any increase in pressure greater than the opposing pressure of spring 30 influences the diaphragm for unseating the valve 24, and as a slight movement only is required for opening the port for chamber 19, it will be observed that the device is quickly effective with but a slight increase of pressure in the chamber 13, thus avoiding accumulation of any excessive pressure before the device is operative. The passage 17 connecting the chambers at the opposite ends of the piston, although always open, has its inlet end restricted and is thus non-interfering, when the valve 24 is open, to a quick upward movement of the piston valve, for the escape of the pressure from chamber 19 is sudden, and takes place before it is possible for any renewed equalizing effect upon both sides or ends of the piston valve can occur, which will enable the valve to remain open as long as the valve 24 remains open.

By this construction the soft water service pressure after its rises beyond a determined degree is utilized for operating a pilot valve by means of a diaphragm and in which the valve in a movement to full open position requires but a minimum degree of diaphragm motion, and with the main valve automatically operated under the influence of the city service pressure, capable of moving to any degree required by full opening motion of such main valve.

I claim:—

1. A device of the class described, comprising a casing, having inlet and outlet chambers with a valve seat interposed therebetween and a cylindrical portion open at one end to said inlet chamber, a piston sliding in said cylindrical casing portion, providing an intermediate chamber between said piston and casing heads, said chamber communicating with said inlet chamber through a permanently opened passage through said piston, and said piston at its opposite end having a reduced diameter valve portion within said inlet chamber normally engaged upon said seat, a by-passage connecting said outlet chamber and intermediate chamber, a pilot valve for normally closing said by-passage, and means non-influenced by any pressure in said chambers, for actuating said pilot valve to open said by-passage, whereby when said pilot valve is opened the pressure in said inlet chamber will move the piston and its valve portion unseating the valve.

2. In a water supply system, a valve under the control of the pressure developed by the pumping apparatus thereof and for controlling the operation of said pumping apparatus, said valve comprising a casing providing a piston chamber having a valve seat, said casing having a water supply inlet of said system and a water supply outlet thereof at opposite sides of said valve seat, a piston slidable in said chamber and having a reduced valve end to take against said valve seat, said piston having a passage therethrough communicating at one end with said water supply inlet, a by-pass in said casing communicating with said water supply outlet, said by-pass adapted to communicate with the passage through the piston, a pilot valve for controlling the communication between said by-pass and said piston passage, and means for controlling said pilot valve by pressure of water from a source other than that of said water supply.

3. In a water supply system, a valve under the control of the pressure developed by the pumping apparatus thereof and for controlling the operation of said pumping apparatus, said valve comprising a casing providing a piston chamber having a valve seat, said casing having a water supply inlet of said system and a water supply outlet thereof at opposite sides of said valve seat, a piston slidable in said chamber and having a reduced valve end to take against said valve seat, said piston having a passage therethrough permanently communicating at one end with said water supply passage, a by-pass communicating with said water supply outlet and adapted to communicate with the piston chamber at one end of said piston, a pilot valve located within the passage in said piston and adapted to control communication through said by-pass, a diaphragm exposed to the pressure of a water supply other than that of the first mentioned water supply, and connections between said diaphragm and said pilot valve.

4. In a water supply system, a valve under the control of the pressure developed by the pumping apparatus thereof and for controlling the operation of said pumping apparatus, said valve comprising a casing providing a cylindrical piston chamber of substantially uniform diameter throughout and having a valve seat at the lower end of said valve chamber, said casing having a water supply inlet of said system and a water supply outlet thereof at opposite sides of said valve seat, a cylindrical piston slidable in said chamber and having within said chamber a lower reduced end constituting a valve to take against said valve seat, said piston having a passage therethrough communicating at one end with said water supply inlet, a by-pass communicating with said water supply outlet, said by-pass adapted to communicate with the passage through the piston, a pilot valve within said piston for controlling said by-pass, and means for controlling said pilot valve by pressure of water from a source distinct from that of said water supply.

5. In a water supply system, a valve under the control of the pressure developed by the pumping apparatus thereof and for controlling the operation of said pumping apparatus, said valve comprising a casing providing a cylindrical valve chamber having a valve seat at and constituting the lower end of said chamber, said casing having a water supply inlet of said system and a water supply outlet thereof at opposite sides of said valve seat, a cylindrical valve of less length than said chamber and slidable therein and having an integral end of a reduced diameter and constituting a valve end to take against said valve seat within said chamber, said piston having a passage therethrough communicating at one end with said water supply inlet, a by-pass communicating with said water supply outlet, said by-pass adapted to communicate with the passage through the piston, a normally closed pilot valve for controlling the communication between said by-pass and said piston passage, and means for controlling said pilot valve by pressure of water from a source distinct from that of said water supply.

6. In a combined city water and soft water supply system, a valve under the control of the soft water pressure developed by the pumping apparatus of the system, and for controlling the operation of said pumping apparatus, said valve comprising a casing providing a piston chamber having a valve seat, said casing having a city water supply inlet of said system and a city water supply outlet thereof at opposite sides of said valve seat, a piston slidable in said chamber and having a reduced valve end to take against said valve seat, said piston having a passage therethrough communicating at one end with said city water supply inlet, a by-pass in said casing communicating with said city water supply outlet, said by-pass adapted to communicate with the passage through the piston, a pilot valve for controlling the communication between said by-pass and said piston passage, and a diaphragm operatively connected with said pilot valve and exposed to the pressure of the soft water supply.

In witness whereof I hereunto subscribe my name, as attested by the two subscribing witnesses.

HUGH W. KIMES.

Witnesses:
EMMA SPENER,
L. A. BECK.